United States Patent [19]

Snyder et al.

[11] Patent Number: 4,744,973

[45] Date of Patent: May 17, 1988

[54] INORGANIC POLYMERIC CATIONIC ION EXCHANGE MATRIX

[75] Inventors: Thomas S. Snyder, Oakmont; Edward J. Lahoda, Edgewood Boro, both of Pa.

[73] Assignee: Westinghouse Electric Corp., Pittsburgh, Pa.

[21] Appl. No.: 803,023

[22] Filed: Nov. 29, 1985

[51] Int. Cl.$^4$ .................. C01B 25/01; C01B 17/96; C01D 31/24; C01G 25/02

[52] U.S. Cl. .................. 423/305; 423/419 P; 423/544; 423/595; 423/608; 210/682; 210/687

[58] Field of Search ............ 423/419 P, 305, 608, 423/544, 595

[56] References Cited

U.S. PATENT DOCUMENTS

| | | | |
|---|---|---|---|
| 2,943,059 | 6/1960 | Beck | 252/179 |
| 2,980,507 | 4/1961 | Rossmy | 423/608 |
| 3,028,297 | 4/1962 | Lagally | 423/608 |
| 3,056,647 | 10/1962 | Amphlett | 423/608 |
| 3,128,247 | 4/1964 | Cohen | 210/37 |
| 3,485,763 | 12/1969 | Lefevre | 252/179 |
| 3,655,329 | 4/1972 | Shih et al. | 423/419 P |
| 4,238,347 | 12/1980 | Gancy et al. | 423/305 |
| 4,251,285 | 2/1981 | Yoldas | 136/256 |
| 4,272,588 | 6/1981 | Yoldas et al. | 428/433 |
| 4,333,847 | 6/1982 | Tran et al. | 252/629 |
| 4,346,131 | 8/1982 | Yoldas | 428/35 |
| 4,361,598 | 11/1982 | Yoldas | 427/24 |
| 4,376,070 | 3/1983 | Pope et al. | 252/629 |
| 4,377,507 | 3/1983 | Pope et al. | 252/629 |
| 4,422,965 | 12/1983 | Chickering | 252/629 |
| 4,465,739 | 8/1984 | Yoldas | 428/432 |
| 4,487,711 | 12/1984 | Pope et al. | 252/629 |
| 4,526,765 | 7/1985 | Ito et al. | 423/305 |
| 4,574,078 | 3/1986 | Cortesi et al. | 423/608 |

OTHER PUBLICATIONS

Zaitsev et al, Complexes of Zirconium with Various Acidoligands, Russian Journal of Inorganic Chemistry, 13(5) 1968, pp. 689-692.

Pospelova et al, Carbonato-Compounds of Zirconium, Russian Journal of Inorganic Chemistry, 11(8), Aug. 66, pp. 995-1003.

*Primary Examiner*—Gary P. Straub
*Attorney, Agent, or Firm*—A. Mich, Jr.

[57] ABSTRACT

Disclosed is an inorganic polymeric cationic ion exchange matrix which is the condensation polymerized reaction product of components including an alkyl compound of an element that has a valence of at least three, water, and a dopant having groups including an ion exchangeable moiety and a replaceable hydrogen. The ion exchange matrix is preferably made by adding the water to the alkyl compound first followed by the addition of the dopant, followed by heating to dryness. The resulting product is a powder or granule that can be used as an ion exchange matrix by placing it in a column and passing a solution through it which contains metal ions that are exchanged with ions on the polymer.

7 Claims, No Drawings

INORGANIC POLYMERIC CATIONIC ION EXCHANGE MATRIX

BACKGROUND OF THE INVENTION

In decommissioning high level radioactive sites, such as power plants, various highly radioactive aqueous fluids must be treated and disposed of. These fluids can be produced during the operation of the plant or they can be the result of solubilizing radioactive deposits on plant hardware. Before these fluids can be disposed of, they must be treated to remove the radioactive ions dissolved therein. This is typically accomplished by passing the fluids through ion exchange resins.

This treatment has not been entirely satisfactory, however, because the fluids often attack the ion exchange resins, break them down, and render them useless. This is because ion exchange resins are made of organic polymers, and organic polymers are degraded by intense radiation, and by the very low pH of some of the fluids.

SUMMARY OF THE INVENTION

We have discovered that inorganic cationic ion exchange matrices, which are resistant to both chemical (e.g., acidic) attack and to radiation, can be formed by the polymerization of certain inorganic alkyl compounds in the presence of water and an ion exchange dopant. The ion exchange matrices of this invention are capable of removing most of the highly radioactive cations found in decommissioned power plant fluids as well as other cations, such as calcium and barium, which must be removed from fluids during the operation of nuclear power plants to ensure their proper operation. We have also found that the ion exchange groups in the inorganic matrices of this invention can be selected to be specific for particular ions, so that only certain cations are exchanged on the matrix.

DESCRIPTION OF THE INVENTION

The alkyl compound useful in this invention are alkyls of elements selected from the group consisting of boron, silicon, zirconium, aluminum, titanium, and hafnium that have a valence of at least three. Alkyls of elements that have a valence of one or two cannot be used in this invention because alkyl compound that have a valence of one act as chain terminators and prevent gelation, and alkyl compound that have a valence of two cannot crosslink the polymer and thereby form an insoluble solid. Suitable alkyl compound have the general formula $MR_n$, where M is a element that has a valence of at least three (i.e., "n," the valence of the element M, is at least three), and R is alkyl from $C_1$ to $C_4$. Zirconium is preferred when the ion exchange matrix is placed in the core of nuclear reactor because of its low neutron cross-section. Mixtures of alkyl compound can be used, but preferably only a single alkyl compound is used because the resulting mixed oxide tends to be less resistant to concentrated nitric and sulfuric acids than is a single oxide. While the R group in the general formula can be larger than butyl, larger alkyl groups are difficult to make, more expensive, produce a less easily volatilized alcohol, and offer no additional advantage. The R group is, therefore, preferably methyl as those alkyl compound are inexpensive and easily volatilized.

In the preferred process of making the inorganic polymer of this invention, water is added to the alkyl compound to begin the polymerization, and the addition of the water is followed by the addition of a dopant. The water is preferably added first because the dopant is generally more reactive with the alkyl compound than is the water and, if the dopant is added first, it will tend to chain terminate the growing polymer.

While not always necessary, it is preferred to add an alcohol, preferably the alcohol that is formed in the polymerization reaction so that different alcohols are not present that must be separated, to the water, the dopant, or preferably, to both, as a diluent in a molar ratio of alcohol to alkyl compound of about 1 to 1 to about 4 to 1.

The dopant performs the ion exchange function in the resulting ion exchange matrix. In order to perform this function, the dopant must have a group, such as a replaceable hydrogen, that will bond with the growing inorganic polymer as well as having an ion exchangeable moiety such as, for example, hydrogen, hydroxyl, or sodium. The dopant is typically sulfuric acid, sulfonic acid, phosphoric acid, chromic acid, or carbonic acid, and forms a sulfate, phosphate, chromate, or carbonate group, respectively, on the polymer.

Both the water and the dopant react with the alkyl compound and promote its polymerization as shown by the following equations, which illustrates the polymerization of methyl zirconium using water and a sulfuric acid dopant.

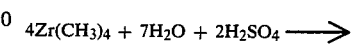

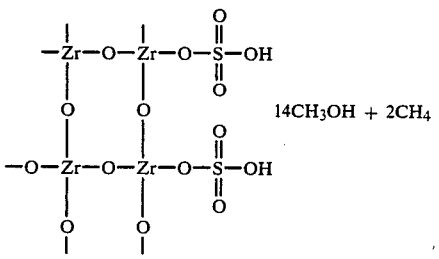

The reaction of the water and the dopant with the alkyl compound occurs at room temperature and is typically exothermic, although it is usually not necessary to cool the mixture.

The amount of water plus dopant should be about 30 to about 50% of the stoichiometric amount required to replace all of the alkyl groups that are present on the alkyl compound, and preferably should be about 40 to about 45% of the stoichiometric requirement. If more water and dopant are used, the polymer chain will be very short which will result in a very small particle size, and if less water and dopant are used, the alkyl compound will be incompletely polymerized and will contain free alkyl groups which will carbonize during subsequent heating, resulting in large chucks of solid. The amount of water should be about 50 to about 80 mole % of the total amount of water plus dopant, and preferably about 60 to about 70 mole %, because if more water is used the ion exchange capcity of the matrix will be low, and if less water is used the dopant will substitute for the water and the matrix will be less stable.

After the polymerization reaction has gone to completion, the mixture is heated to volatilize any water and organics that may be present and form a dry product. This can be accomplished by heating at, for example, about 300° to about 650° C. Higher temperatures should be avoided because the dopant may be volatilized or, at still higher temperatures, the matrix may melt.

The particle size of the product can be controlled by adjusting the pH of the mixture during polymerization. A fine particle size might be desirable, for example, if the inorganic ion exchange matrix is to be used as a pre-coat on a filter, while a granulated particle size may be desirable is the ion exchange matrix is to be used in a large column in order to avoid a large pressure drop across the column.

It should be noted that the product of this invention is a powder or granule and is not fused or vitrified. Fusion and vitrification must be avoided as a fused or vitrified product will not perform ion exchange well because it will not be porous, and because heating to the fusion temperature will drive off the ion exchange group of the dopant. Thus, the product must not be sintered.

The product can be used by placing it in a container and passing the solution containing the metal ions to be removed through it. When the ion exchange matrix has become exhausted and can no longer remove metal ions from the solution, it can be regenerated by passing an acidic solution through it. While many types of metal ions can be removed by means of the ion exchange matrices of this invention, they are particularly useful in removing cobalt, calcium, strontium, cesium, and barium ions.

The following example further illustrates this invention.

EXAMPLE

Into a larger beaker is placed 151 grams of methyl zirconium to which is added with stirring 28.8 mls of water and 40 ml of methanol at room temperature. After ten minutes, a dopant of 39 grams of $H_2SO_4$ dissolved in 40 mls of methanol is added with stirring for another 30 minutes. The product is then heated to a temperature of 300° C. for two hours to volatilize excess water and methanol, leaving a powdery product.

The resulting dry product is placed in a 0.5 inch diameter column 16 inches long, and a solution containing 10% by weight $H_2SO_4$, 1% by weight Ca, and 89% by weight $H_2O$, is passed through the column. The Ca ions are removed from the solution by the ion exchange matrix in the column.

We claim:

1. A method of making an inorganic polymeric cationic ion exchange matrix comprising
   (A) adding a quantity of water to an alkyl compound having the general formula $M(R)_n$, where M is an element having a valence of at least 3 selected from the group consisting of B, Si, Zr, Al, Ti, Hf, and mixtures thereof, and R is alkyl from $C_1$ to $C_4$;
   (B) adding to said water and said alkyl compound a dopant that forms a group on said matrix selected from the group consisting of sulfate, phosphate, chromate, carbonate, and mixtures thereof, where the amount of said water plus said dopant is about 30 to about 50% of the amount stoichiometrically required to replace all of the alkyl groups that are present on said alkyl compound, and the amount of said water is about 50 to about 80 mole % of the amount of said water plus said dopant; and
   (C) drying at about 300° to about 600° C.

2. A method according to claim 1 wherein M is Zr.

3. A method according to claim 1 wherein R is methyl.

4. A method according to claim 1 wherein said water and said dopant are together about 40 to about 45% of stoichiometric, and, of the total of said water and said dopant, said water is about 60 to about 70 mole %.

5. A method according to claim 1 including adding an alcohol in a molar ration with said alkyl compound of about 1 to 1 to about 4 to 1.

6. A method of making an inorganic polymeric cationic exchange matrix comprising
   (A) forming a polymerizable composition by mixing together water, an alkyl compound having the general formula $M(R)_n$, where M is an element having a valence of at least 3 selected from the group consisting of B, Si, Zr, Al, Ti, Hf, and mixtures thereof, and R is alkyl from $C_1$ to $C_4$, and a dopant that forms a group on said matrix selected from the group consisting of sulfate, phosphate, chromate, carbonate, and mixtures thereof, where the amount of said water plus said dopant is about 30 to about 50% of the amount stoichiometrically required to replace all of the alkyl groups that are present on said alkyl compound, and the amount of said water is about 50 to about 80 mole % of the amount of said water plus said dopant; and
   (B) drying said composition.

7. A method of making an inorganic polymeric cationic ion exchange matrix comprising
   (A) forming a composition that is polymerizable through a condensation reaction by adding a quantity of water and alcohol to an alkyl compound that has the general formula $M(R)_n$ where M is an element selected from the group consisting of B, Si, Zr, Al, Ti, Hf, and mixtures thereof, n is the valence of M, R is alkyl from $C_1$ to $C_4$, and said alcohol has the formula ROH and is in a molar ratio with said alkyl compound of about 1 to 1 to about 4 to 1;
   (B) adding to said water, alcohol, and alkyl compound a quantity of a dopant that forms a group on said matrix selected from the group consisting of sulfate, phosphate, chromate, carbonate, and mixtures thereof, where the amount of said water plus said dopant is about 30 to about 50% of the amount stoichiometrically required to replace all of the alkyl groups that are present on said alkyl compound, and the amount of said water is about 50 to about 80 mole % of the amount of said water plus said dopant; and
   (C) drying at about 300° to about 600° C.

* * * * *